(12) United States Patent
Barrington et al.

(10) Patent No.: US 9,032,000 B2
(45) Date of Patent: May 12, 2015

(54) SYSTEM AND METHOD FOR GEOLOCATION OF SOCIAL MEDIA POSTS

(71) Applicant: DigitalGlobe, Inc., Longmont, CO (US)

(72) Inventors: Luke Barrington, San Diego, CA (US); Nathan Ricklin, San Diego, CA (US); Shay Har-Noy, San Diego, CA (US)

(73) Assignee: Digital Globe Inc., Longmont, CO (US)

( * ) Notice: Subject to any disclaimer, the term of this patent is extended or adjusted under 35 U.S.C. 154(b) by 245 days.

(21) Appl. No.: 13/840,173

(22) Filed: Mar. 15, 2013

(65) Prior Publication Data

US 2014/0236916 A1 Aug. 21, 2014

Related U.S. Application Data

(60) Provisional application No. 61/766,655, filed on Feb. 19, 2013.

(51) Int. Cl.
*G06F 17/30* (2006.01)

(52) U.S. Cl.
CPC ................................ *G06F 17/30864* (2013.01)

(58) Field of Classification Search
USPC .................... 707/706, 736, 758, 804
See application file for complete search history.

(56) References Cited

U.S. PATENT DOCUMENTS

| | | | | |
|---|---|---|---|---|
| 8,365,243 B1* | 1/2013 | Lu et al. | | 726/1 |
| 2009/0189811 A1* | 7/2009 | Tysowski et al. | | 342/357.15 |
| 2009/0222482 A1* | 9/2009 | Klassen et al. | | 707/104.1 |
| 2010/0046842 A1* | 2/2010 | Conwell | | 382/218 |
| 2011/0145256 A1* | 6/2011 | Dunkel et al. | | 707/743 |
| 2011/0173214 A1* | 7/2011 | Karim | | 707/754 |
| 2011/0212717 A1* | 9/2011 | Rhoads et al. | | 455/420 |
| 2012/0046042 A1* | 2/2012 | Son | | 455/456.1 |
| 2012/0210227 A1* | 8/2012 | Lin | | 715/723 |
| 2012/0221687 A1* | 8/2012 | Hunter et al. | | 709/219 |
| 2012/0296643 A1* | 11/2012 | Kristjansson et al. | | 704/226 |
| 2013/0018881 A1* | 1/2013 | Bhatt | | 707/736 |
| 2013/0036364 A1* | 2/2013 | Johnson | | 715/738 |
| 2013/0332068 A1* | 12/2013 | Kesar et al. | | 701/430 |

\* cited by examiner

*Primary Examiner* — Cam-Linh Nguyen (74) *Attorney, Agent, or Firm* — Galvin Patent Law LLC; Brian R. Galvin (57) ABSTRACT

A system for geolocation of social media posts, comprising a social search engine; a geolocation software module; and a network-attached database comprising at least a media storage and a metadata storage. The social search engine retrieves a plurality of social media content postings and stores them in the database; and the geolocation software module geolocates a first social media content posting by: extracting metadata from the posting; extracting embedded location data from the posting; identifying an author of the posting; determining if the metadata storage contains location-related data about the author, if one was identified; determining if author location data is available; identifying any known place names in the social media content posting; disambiguating a plurality of locations obtained; and geotagging the posting and storing the resulting geotagged posting in the metadata storage.

2 Claims, 5 Drawing Sheets

SYSTEM AND METHOD FOR GEOLOCATION OF SOCIAL MEDIA POSTS

CROSS-REFERENCE TO RELATED APPLICATIONS

This application claims priority to U.S. provisional patent application Ser. No. 61/766,655 titled "SYSTEM AND METHOD FOR GEOLOCATION OF SOCIAL MEDIA POSTS", filed on Feb. 19, 2013, the entire specification of which is incorporated hereby by reference.

BACKGROUND OF THE INVENTION

1. Field of the Invention

The invention relates to the field of social networking media, and more particularly to the field of location-based social media.

2. Discussion of the State of the Art

In the field of social media, it is common for users to post content while mobile, using such devices as network-enabled tablet computing devices or smartphones. Such content posting may or may not be bundled with a "location" tag or input field, but even when such a field is included it may not be utilized by a user while posting (such as when posting in a hurried fashion or making multiple posts at a time, some fields may be omitted for brevity). Such content is then posted with no embedded knowledge of a poster's location, which may be desirable to those following the poster's content or attempting to gather information from social media sources.

It is also becoming increasingly common in the art to wish to view various content on a map or view of the globe (such as Google Earth), for various purposes such as viewing community-uploaded reviews of restaurants or lodging along a potential trip route, or searching for highly-rated activities to decide what to do when a destination is reached. Such content may come a from a variety of sources, but ultimately depends on that content possessing embedded location information for pinpointing it on a map for display. Content that is uploaded without any sort of location information may not be displayed, even if it could be highly relevant.

What is needed, is a solution that can infer location-based data for content that is uploaded without explicit location information attached. Such content may then be ranked and displayed alongside that which has embedded information, enabling more relevant and thorough location-based social content viewing.

SUMMARY OF THE INVENTION

Accordingly, the inventor has conceived and reduced to practice, in a preferred embodiment of the invention, a system and method for geolocating (that is, attaching location-based data where previously there may have been none) social media content.

According to a preferred embodiment of the invention, a system for determining geolocation metadata to social networking content comprising media and metadata storage, social search engine, geolocation and relevancy modules, is disclosed. According to the embodiment, the components of the system of the invention may be connected to a communications network such as an Internet or similar network, via a web server and an application server, which handle communication between components of the system and other devices on a network. A Media storage may be utilized to house social networking media for access by components of the system, and a metadata storage may be used to house a repository of known social media content metadata such as usernames, social media identifiers such as "hash tags" used to categorize and qualify posted content, keywords or other metadata. Such storage systems may be a physical storage device such as a hard disk drive or other storage medium (such as magnetic or optical storage devices common in the art), or may be a software-based storage solution such as any of a number of database systems found in the art. It will be further appreciated that such storage may be housed locally (relative to other components of the system of the invention), or it may be remotely hosted and accessed such as internet-connected cloud storage solutions common in the art, and further that media and metadata storage may or may not be distinct (that is, they may be operated within a single storage device, or they may be distinct devices operated independently).

A social search engine may "crawl" or search through social media content posted by users on an Internet or other communications network, comparing content to stored metadata for matches. Resultant content with metadata identified may be sent to a geolocation module, which may then utilize known metadata to ascertain any potential location-based data which may be relevant to the content in question. For further analysis, relevancy modules may be employed to perform further search and analysis on content, such as relevancy rankings of various metadata to improve the accuracy and relevancy of any location-based data, image extraction and search to determine location-based data from photographic references, or comparison of current content to previously-analyzed content for analysis (such as referring to previous content posted by a user where a location may have been known). Resultant content (now with both metadata and relevancy data attached) may be stored in a "mined content" storage, which may be the same storage used for metadata or it may be a distinct storage solution according to a specific implementation of the system of the invention. It should be appreciated that all components and modules described are exemplary and their functions may be carried out by one or more alternate components according to the invention, and it should be further appreciated that such components may be either physical or virtual in nature (that is, they may be software components operating in a computing device or they may be physical computing devices dedicated to their respective functions), and a variety of alternate arrangements may be utilized according to the invention.

In another preferred embodiment of the invention, a method for determining geolocation data for social media content such as might be implemented in a system as described previously, is disclosed. According to the embodiment, social media content is first retrieved (such as via a search engine as described above) for processing. Metadata may be extracted from the content for analysis, such as checking for any existing location-based data embedded in the content. Then, resultant content and metadata may be compared against previously-known metadata or previous social media content postings, as might be useful in determining relevancy or in selecting new data for storage in future analysis. Resultant refined content may then be acted upon according to the results of previous search and analysis, such as updating metadata or embedding new data with geolocation information based on the analysis of previous information and relevancy scoring. In this manner, social media may be aggregated from a number of sources and "mined" or examined for relevant data. By scoring such data, erroneous results may be minimized and output optimized for relevance and accuracy. By comparing to previous data, previously-unknown data may be uncovered such as locations based on previous posts regarding similar topics or from a same content poster.

According to a preferred embodiment of the invention, a system for geolocation of social media posts is disclosed, comprising a social search engine; a geolocation software module; and a network-attached database comprising at least a media storage and a metadata storage. The social search engine retrieves a plurality of social media content postings and stores them in the database; and the geolocation software module geolocates a first social media content posting by: extracting metadata from the posting; extracting embedded location data from the posting; identifying an author of the posting; determining if the metadata storage contains location-related data about the author, if one was identified; determining if author location data is available; identifying any known place names in the social media content posting; disambiguating a plurality of locations obtained; and geotagging the posting and storing the resulting geotagged posting in the metadata storage.

According to another preferred embodiment of the invention, a method for geolocation of social media posts is disclosed, comprising the steps of: (a) retrieving, using a social search engine stored and operating on a network-attached computer, a plurality of social media content postings; (b) storing the plurality of social media content postings in a network-attached database comprising at least a media storage and a metadata storage; (c) geolocating, using a geolocation software module stored and operating on a network-attached computer, a first social media content posting by: (i) extracting any metadata present in or associated with the social media content posting; (ii) extracting any embedded location data in or associated with the social media content posting; (iii) identifying an author of the social media content posting; (iv) determining if the metadata storage contains location-related data about the author, if one was identified; (v) determining if location data pertaining to a physical location of the author at the time of posting of the social media content posting is available; (vi) identifying any known place names present in or associated with the social media content posting; and (vii) if a plurality of locations is obtained as a result of steps (i)-(vi) that comprises more than one potential location, disambiguating, using a relevancy software module, the plurality of locations to determine a most likely location; and (d) geotagging the social media content posting and storing the resulting geotagged social media content posting in the metadata storage.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

The inventor has conceived, and reduced to practice, a system and method for geolocating social media content postings.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention (s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

DEFINITIONS

"Geolocation", as used herein, refers to any of a variety of location-based data which may be relevant to social media content, such as a content poster's location when content was uploaded, or locations relevant to the specific nature of the content (Such as, for example, the location of a restaurant being discussed in a content posting).

"Geolocating", as used herein, refers to the process of analyzing social media content and using analysis data to determine relevant geolocation data, and when appropriate attaching new data to content for further refinement or use.

"Mined content", as used herein, refers to content that may have been passed through any number of search, filter, or analysis components for refinement, and which may or may not have additional data from such a process. For example, an image posted to a social media source might be analyzed for any embedded location data (As is common with modern cameras or photography-capable devices such as smartphones or other computing devices with image-capture functionality), and new metadata might be embedded as a result prior to storage.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Figure 1:
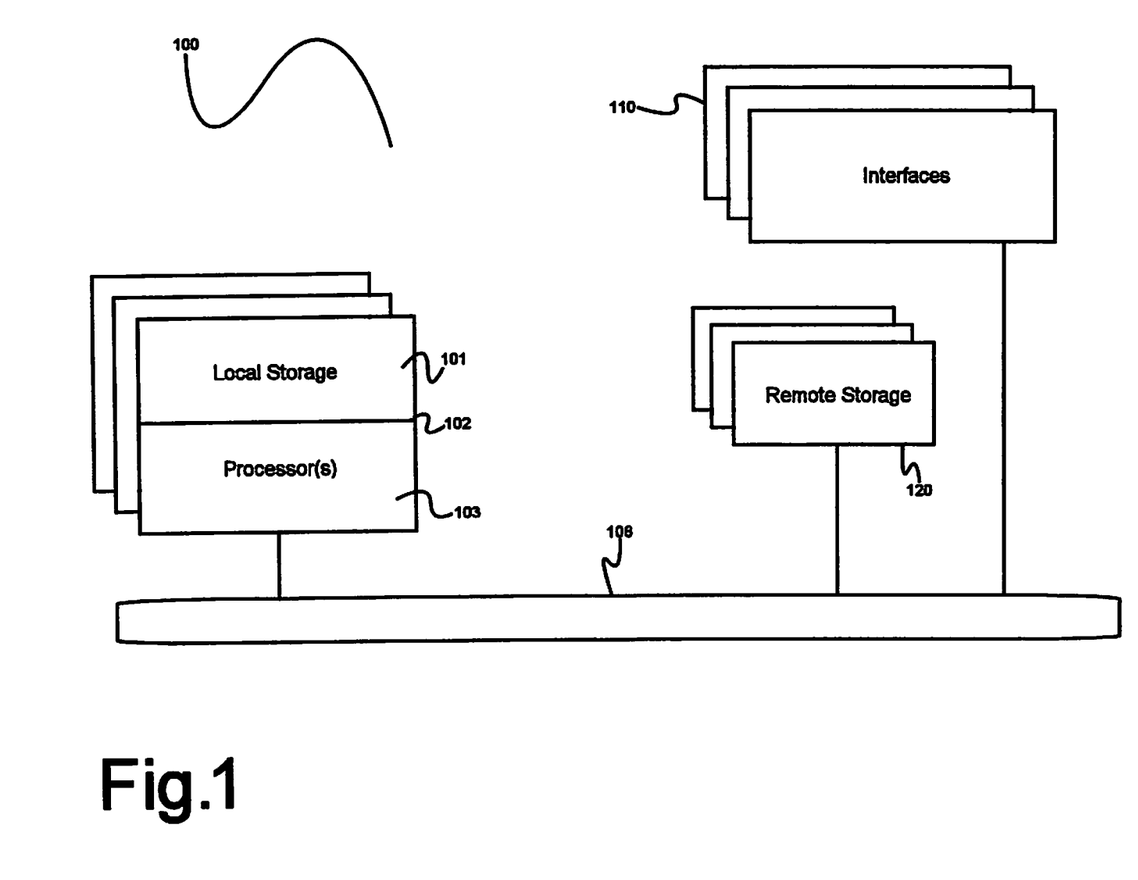
FIG. 1 is a block diagram illustrating an exemplary hardware architecture of a computing device used in an embodiment of the invention.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some in stances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
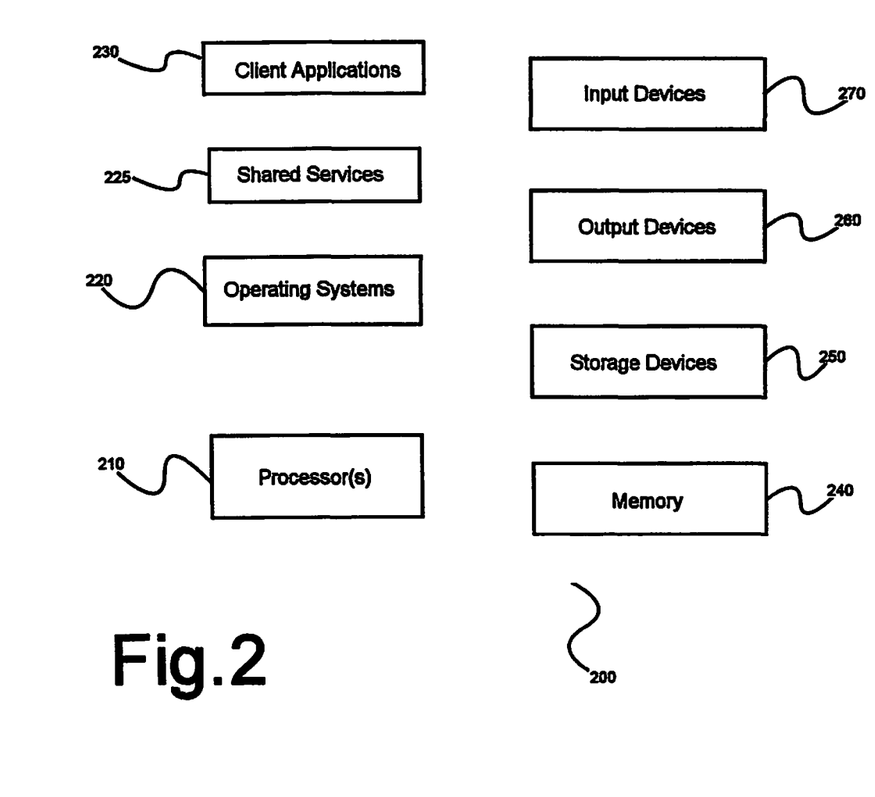
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
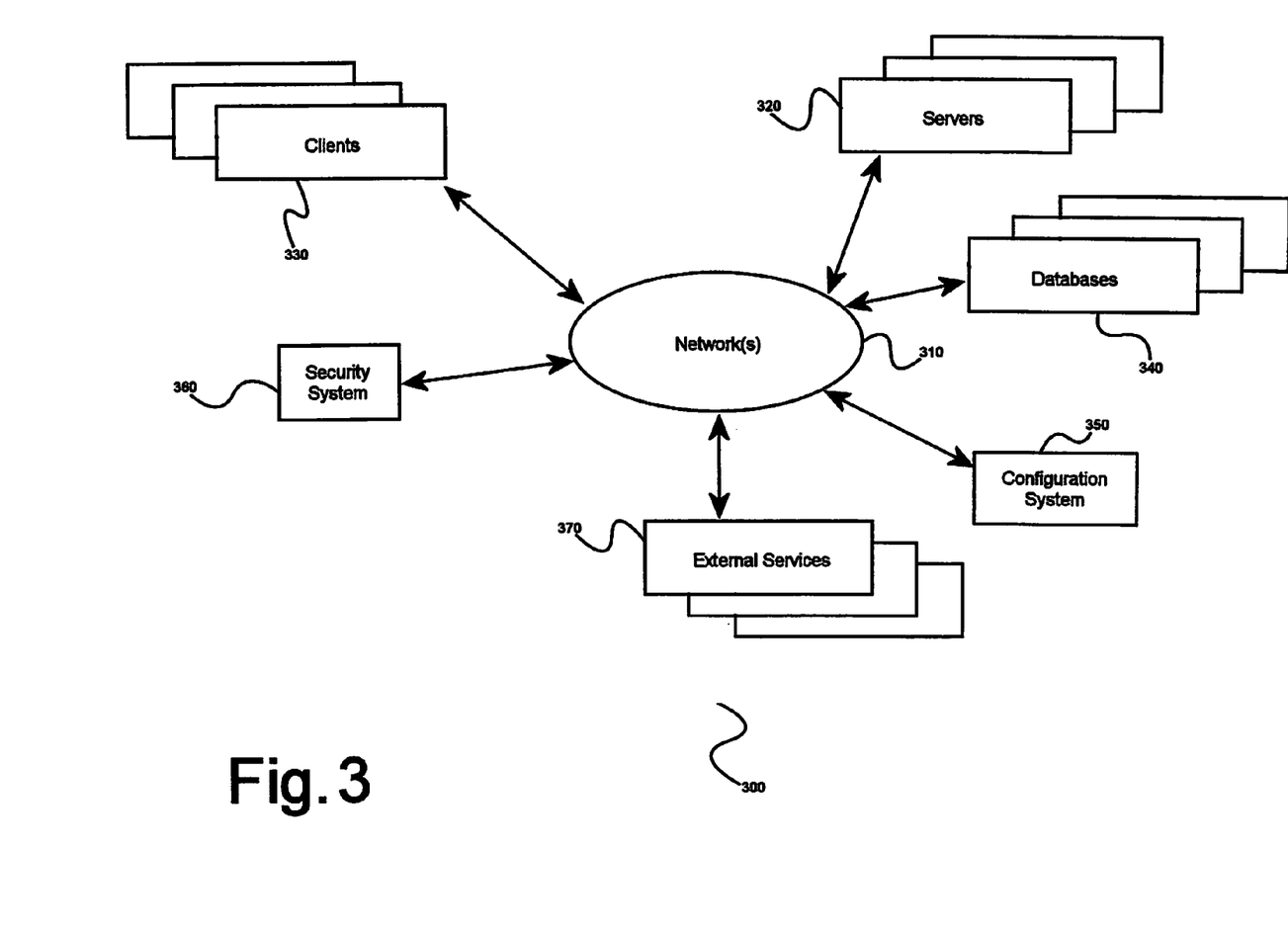
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 4:
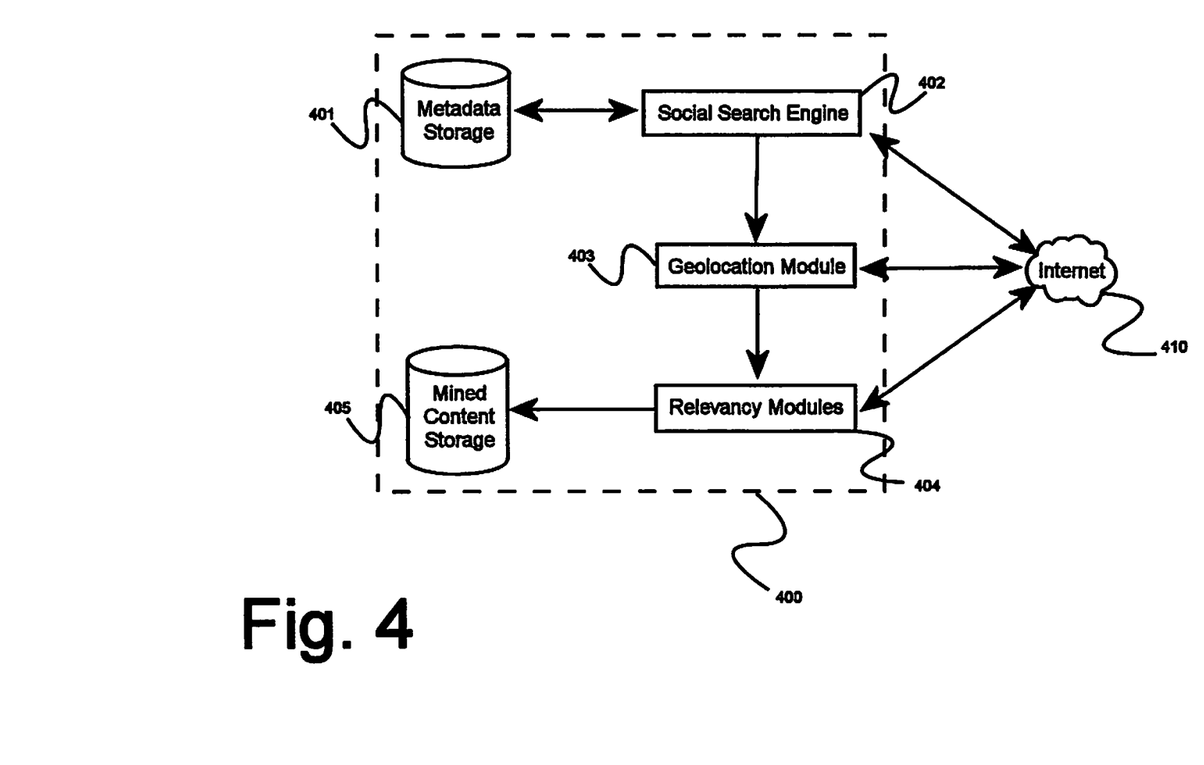
FIG. 4 is a block diagram of an exemplary system architecture for analyzing social media content and determining geolocation data, according to a preferred embodiment of the invention.

FIG. 4 is a block diagram illustrating an exemplary system architecture for a system 400 for analysis of geolocation data of social content, according to a preferred embodiment of the invention. As illustrated, system 400 may comprise a number of components such as (but not limited to) a metadata storage 401, social search engine 402, geolocation module 403, a plurality of relevancy modules 404, and a media storage 405. As illustrated, a plurality of components may be connected and in communication with Internet 410 or another communications network via a web infrastructure 420 comprising components common in the art such as a web server 421, which may handle communication with other network-enabled services or devices, an application server 422, which may handle communications between a web server and components of system 400 as well as storage of data in a database 423 or other storage medium for access by both elements of system 400 and elements of web infrastructure 420 (such as stored webpage elements or search histories), as may be desirable for retrieval of social media content or other information during system operation. It will be appreciated that such communication with an external network is not necessary for a system 400 to function, and that in some cases it may be desirable to use the function of system 400 on locally-stored data alone rather than accessing it over a network, such as (for example) analyzing a static repository of social media content—that is, a stored quantity of content that is not connected to a communications network and is not subject to change. Such an implementation might be useful, for example, for analyzing a large quantity of social media content stored in a database 405 for the purpose of improving a metadata storage 401 or simply as a test of function (where output data might be examined for relevancy and usefulness to determine the operational quality of a system 400).

Storage devices illustrated may be accessed in a bidirectional manner by other components of system 400. That is, they may be accessed both for retrieval of storage data as well as to store new data as appropriate during operation. For example, a social search engine 402 might encounter new metadata in the results of a search of content over a network 410, and store this data for future reference. In this manner, stored data may be continually evolving and increasing in granularity and relevancy, improving function of a system 400 as well as relevancy of content output.

A social search engine 402 may access content stored locally (such as in a media storage 405), or content hosted across a network such as an Internet 410. Such content may be of varied nature, and uploaded by users via various devices such as a personal computer 412, tablet or smartphone computing device 413, or any similar networking-enabled devices as are common in the art. Media that is retrieved may be stored in a media storage 405 and passed to other components of system 400 for processing, such as geolocation module 403 or relevancy modules 404, each of which are described in detail below.

A geolocation module 403 may receive content from a social search engine 402 (or may retrieve content previously posted on a social network that has been stored in a database such as media storage 405), and may further communicate with a network 410 as appropriate, such as to perform further search and analysis of content utilizing known geolocation data (for example, if a person uploading media content has previously made his location known), and using other data to attempt to determine new geolocation data if needed (such as searching a user's previous posts to determine if a location was ever revealed). Geolocation module 403 may be utilized to analyze metadata of social content and use such data to determine geolocation data (for example, by performing further searches on a network 410 for content relevant to known metadata such as a content poster's previously-recorded locations). The methods by which geolocation data may be determined are discussed in greater detail below, referring to FIG. 5.

Geolocation module 403 may then present content (which may now be refined with additional geolocation data that was not present in the content initially) to a plurality of relevancy modules 404 (only one illustrated for brevity, however it will be appreciated that a plurality of modules may be utilized as appropriate according to the invention), which may then perform additional analysis of media, metadata, and geolocation data to determine the relevancy of such data. In this manner, content may be accurately scored prior to final storage, so that potential irrelevant information does not lead to erroneous output (for example, if a user's last known location was recorded several years prior, it may be scored lower with respect to relevancy, as they may have changed location since then). This scored, refined content may then be stored in a database such as media storage 405, where it may be accessed by other systems for use (such as retrieving social media content for overlay on a map display, now that geolocation information is known).

DETAILED DESCRIPTION OF EXEMPLARY EMBODIMENTS

Figure 5:
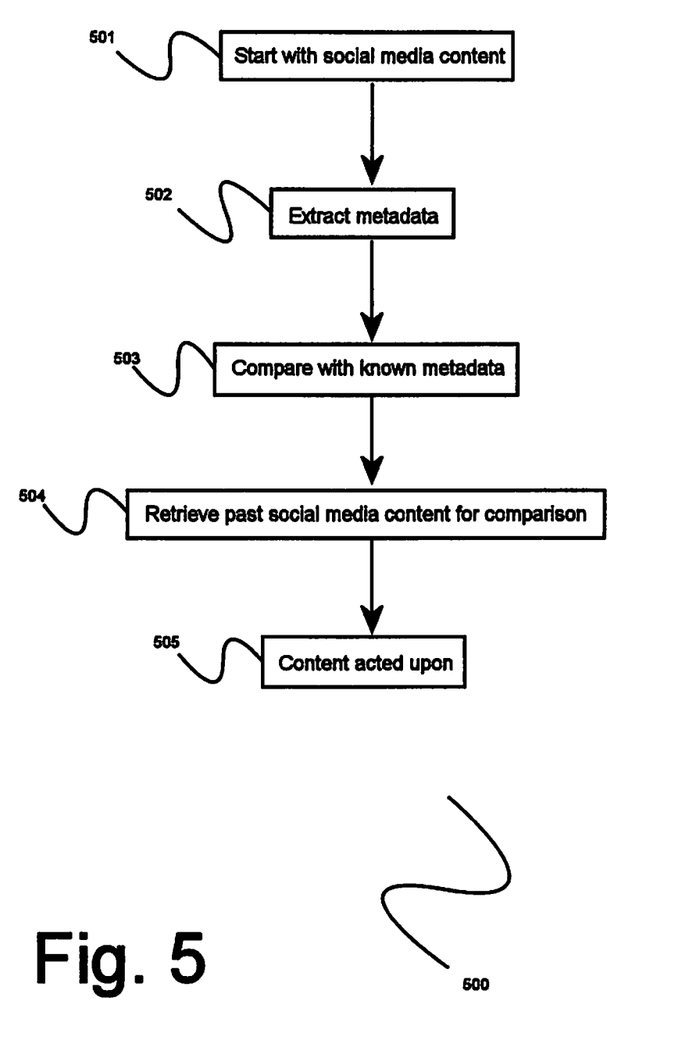
FIG. 5 is a block diagram of an exemplary method for analyzing social media content and determining geolocation data, according to a preferred embodiment of the invention.

FIG. 5 is an illustration of an exemplary method 500 for geolocating of social media content, according to a preferred embodiment of the invention. As illustrated, in a first step 501 social media content is retrieved, either from a database or other storage system, or from a communications network (as described previously, referring to FIG. 4) for processing. In a next step 502, retrieved content is processed and metadata is extracted. Such data may include usernames, proper names, posting date or time, content keywords or qualifier tags, or any other embedded information in a social media posting. In a next step 503, content and metadata may be scanned for any included location information (for example, if a posting contains a "location" field that was filled in by a poster, it can be assumed that this is a valid location identifier). In a next step 504, previous content may be checked to verify whether current content's author is known. Such previous content might be stored from previous searches (as in step 501), or may be previously-uploaded data which may now be retrieved as needed. If an author match is found, in a next step 505 the author's information may be checked for any location cues—for example, many social media account profiles have fields where a user may input their location. In a next step 506, content may be scanned for location names which may be used as location cues (such as a posting reviewing a restaurant, which might be associated with the restaurant's location). In a next step 507, content's text may be searched for additional cues regarding context—for example, a posting might contain information about a restaurant's location (continuing from the previous example), but it is possible that the author was referring to a previous experience and not a current event, which might indicate that the restaurant's location is irrelevant to the current posting's topic. In a final step 508, a content posting may be updated with geotag data based on the results of processing, and then optionally stored for future use in various applications (such as displaying social media postings on a map overlay, or use in future geotag processing).

It will be appreciated that the steps of the method of the invention may yield multiple, and potentially conflicting, results for a single content posting. To handle such an event, relevancy scores may be attributed to various data and results of processing steps, to further refine the process. In such a manner, for example, the results of a context processing step 507 might influence the relevancy scores of previous results after context is determined—such as, continuing from an above example, a posting which contains a reference to a previous restaurant visit might have a low relevancy score given to the location of the restaurant referred to, while a high relevancy score might be assigned to other data such as the author's last known location. In such a manner the results of each step may be ranked and compared to one another to arrive at an optimal final result which may then be recorded as the posting's geotag information.

The skilled person will be aware of a range of possible modifications of the various embodiments described above. Accordingly, the present invention is defined by the claims and their equivalents.

What is claimed is:

1. A system for geolocation of social media posts, comprising:
   a social search engine stored and operating on a network-attached computer;
   a geolocation software module stored and operating on a network-attached computer; and
   a network-attached database comprising at least a media storage and a metadata storage;
   wherein the social search engine retrieves a plurality of social media content postings and stores them in the database; and
   wherein the geolocation software module carries out the following steps to geolocate a first social media content posting:
   (a) extracting any metadata present in or associated with the social media content posting;
   (b) extracting any embedded location data in or associated with the social media content posting;
   (c) identifying an author of the social media content posting;
   (d) determining if the metadata storage contains location-related data about the author, if one was identified;
   (e) determining if location data pertaining to a physical location of the author at the time of posting of the social media content posting is available;
   (f) identifying any known place names present in or associated with the social media content posting;
   (g) if a plurality of locations is obtained as a result of steps (a)-(f) that comprises more than one potential location, disambiguating, using a relevancy software module, the plurality of locations to determine a most likely location; and (h) geotagging the social media content posting and storing the resulting geotagged social media content posting in the metadata storage.

2. A method for geolocation of social media posts, comprising the steps of:
  (a) retrieving, using a social search engine stored and operating on a network-attached computer, a plurality of social media content postings;
  (b) storing the plurality of social media content postings in a network-attached database comprising at least a media storage and a metadata storage;
  (c) geolocating, using a geolocation software module stored and operating on a network-attached computer, a first social media content posting by:
    (i) extracting any metadata present in or associated with the social media content posting;
    (ii) extracting any embedded location data in or associated with the social media content posting;
    (iii) identifying an author of the social media content posting;
    (iv) determining if the metadata storage contains location-related data about the author, if one was identified;
    (v) determining if location data pertaining to a physical location of the author at the time of posting of the social media content posting is available;
    (vi) identifying any known place names present in or associated with the social media content posting; and
    (vii) if a plurality of locations is obtained as a result of steps (i)-(vi) that comprises more than one potential location, disambiguating, using a relevancy software module, the plurality of locations to determine a most likely location; and
  (d) geotagging the social media content posting and storing the resulting geotagged social media content posting in the metadata storage.

* * * * *